C. B. MILLS.
METHOD OF MAKING CURRENT COLLECTOR RINGS.
APPLICATION FILED AUG. 10, 1918.

1,393,564. Patented Oct. 11, 1921.

WITNESSES:
H.B. Funk
Fred A. Lind

INVENTOR
Chester B. Mills.
BY
Wesley G. Carr
ATTORNEY

UNITED STATES PATENT OFFICE.

CHESTER B. MILLS, OF EAST McKEESPORT, PENNSYLVANIA, ASSIGNOR TO WESTINGHOUSE ELECTRIC & MANUFACTURING COMPANY, A CORPORATION OF PENNSYLVANIA.

METHOD OF MAKING CURRENT-COLLECTOR RINGS.

1,393,564.  Specification of Letters Patent.  Patented Oct. 11, 1921.

Application filed August 10, 1918. Serial No. 249,346.

*To all whom it may concern:*

Be it known that I, CHESTER B. MILLS, a citizen of the United States, and a resident of East McKeesport, in the county of Allegheny and State of Pennsylvania, have invented a new and useful Improvement in Methods of Making Current-Collector Rings, of which the following is a specification.

My invention relates to dynamo-electric machines and particularly to current-collector rings for use thereon, and it has for its object to provide a collector ring of the composite type which shall be strong and durable in construction, be possessed of good wearing properties, be of good conductivity and be relatively inexpensive to manufacture.

Heretofore, it has been customary to either construct the entire collector ring of an alloy or to mount a heavy cast copper ring upon a supporting spider member. An alloy ring is objectionable for the reason that the materials of which it is composed tend to segregate themselves, thus causing different degrees of hardness at different points of the ring which result in non-uniformity of wear. Also, during the casting operation, the reaction of the metals upon one another produces a gas the escape of which produces pin holes in the metal that usually contain sand which wears away the brushes very rapidly. Furthermore, the commonly employed alloys, such as a combination of copper, lead and tin, have only approximately 30% of the conductivity of rolled copper, and the conductivity of a contact between a carbon brush and an alloy ring is much lower than the conductivity of a contact between a similar brush and a copper ring. A heavy cast copper ring mounted on a supporting spider is objectionable on account of the fact that it is soft, open grained, and very expensive.

By my invention, I provide a collector ring which is equal, in every respect, to a heavy copper ring mounted on a supporting spider and costs approximately 25% as much.

Figure 1:
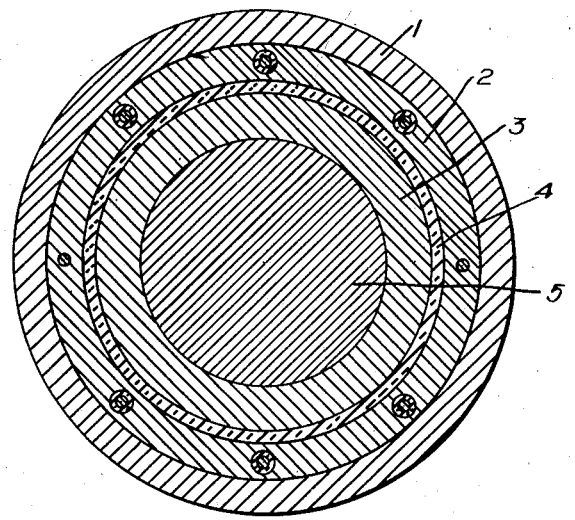
Figure 2:
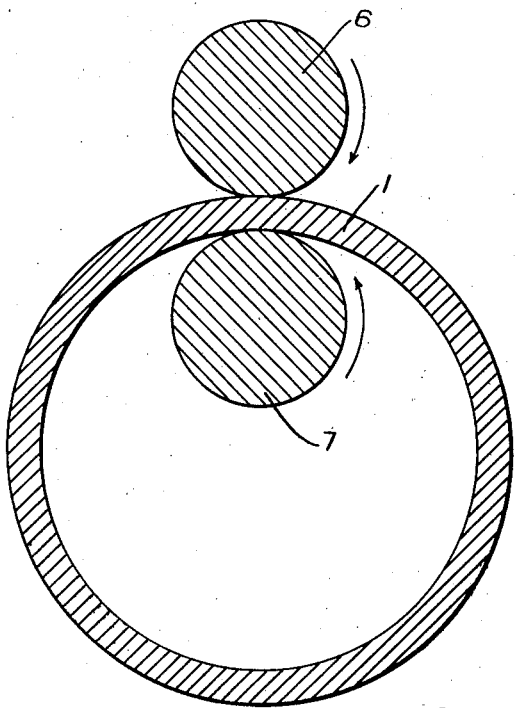

In the accompanying drawings, Figure 1 is a transverse sectional view of a collector ring constructed in accordance with my invention, and Fig. 2 is a similar view of a portion of the machine engaged in manufacturing the same.

Referring more particularly to the drawings, I show a collector ring comprising a rolled copper rim 1 mounted upon an annular cast-iron support 2, by means of which it is strengthened and rendered rigid. The supporting member 2, in turn, is rigidly mounted upon a hub member 3 but is insulated therefrom by means of a layer of insulating material 4. The supporting hub member 3 is mounted upon a shaft 5 of a dynamo-electric machine (not shown).

The collector ring may be manufactured by casting a relatively long copper cylinder, which is cut into rings of the desired width and placed between rollers 6 and 7 of a metal rolling machine as shown in Fig. 2. These rings may also be formed by piercing and expanding a slug cut from a bar. The roller 6 is driven and the roller 7 is merely an idler. The ring is then rolled, or worked, so as to reduce its cross section, thus hardening it and causing the grain of the metal to extend in a circumferential direction. The ring is then shrunk on, or otherwise attached to, the cast-iron supporting member 2 which is afterward mounted upon the supporting hub 3.

In practising my invention, I have found that a cast copper ring, mounted upon a supporting member, may be used. However, it is objectionable on account of the fact that the copper casts with an open grain, and is, therefore, soft, which causes the ring to wear away, rapidly, that pin holes caused by slight impurities in the copper gather small particles of carbon from the brushes and, in turn, cause rapid wearing away of the brushes, and that the tensile strength of cast copper is very low. Furthermore, the conductivity of cast copper is only approximately 80% of that of worked copper.

On the other hand, by rolling the cast copper ring, the pin holes are closed, the metal is made harder, and the grain of the copper is disposed circumferentially, which, together with the fact that the metal is compressed by the rolling operation, greatly increases the tensile strength of the ring, and produces a very good wearing surface.

In the working or rolling operation, I have found that the best temperature for rolling the ring is about 1250° F. If the temperature is appreciably above the degree set forth, when the rolling is started, the ring is frequently broken, since the metal is very weak. If the rolling is started at a temperature appreciably lower than that mentioned, the grain is not properly circumferentially disposed and the desired results cannot be obtained.

It will, of course, be understood that, while it is preferred to use a ring of rolled copper mounted on a supporting ring of cast iron, the copper ring may be replaced by a rolled ring of brass or some other good conducting material, and the cast iron supporting ring may be of steel or even of micarta, the only essential features of the supporting ring being strength and rigidity.

While I have shown one form of my invention and described in detail one application of the same it will be obvious to those skilled in the art that it is not so limited but is subject to various minor changes and modifications without departing from the spirit thereof, and I desire, therefore, that only such limitations shall be placed thereupon as are imposed by the prior art or are specifically set forth in the appended claims.

I claim as my invention:

1. The method of making a collector ring comprising casting a metallic cylinder, working the metal of said cylinder and attaching said cylinder to a centrally disposed body portion.

2. The method of making a collector ring comprising casting a copper cylinder, rolling the metal of said cylinder to produce a circumferential grain therein, and shrinking said cylinder on a cast iron central body portion.

3. The method of making a collector ring comprising casting a metallic cylinder and working the metal of said cylinder so as to produce a circumferential grain therein.

In testimony whereof, I have hereunto subscribed my name this 31st day of July, 1918.

CHESTER B. MILLS.